Patented Nov. 29, 1938

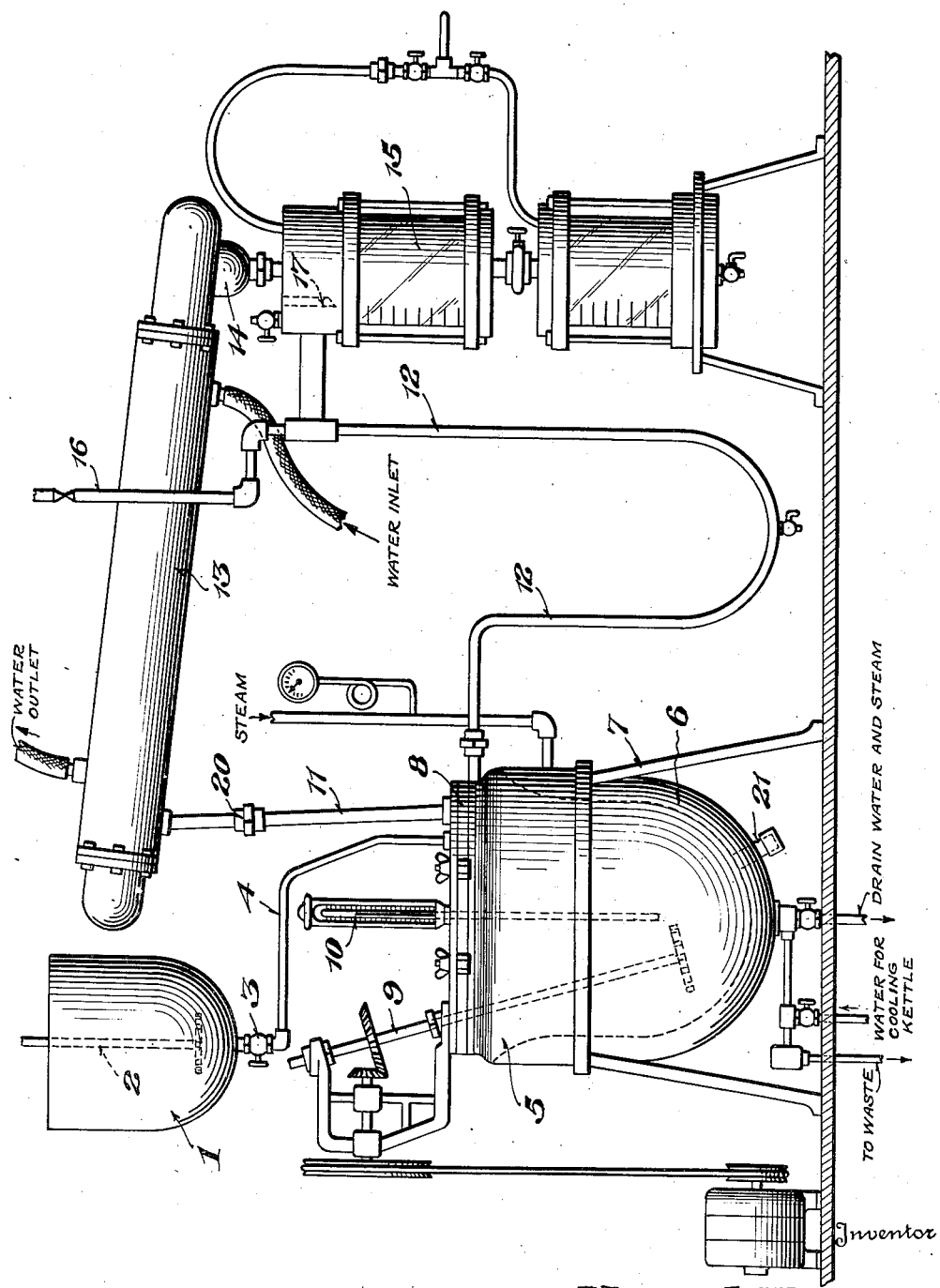

2,138,048

UNITED STATES PATENT OFFICE 2,138,048

MAKING DRY, FREE-RUNNING PIGMENT POWDERS

Vincent Vesce, Forest Hills, Long Island, N. Y., assignor to Harmon Color Works, Inc., Brooklyn, N. Y., a corporation of New York Application March 4, 1935, Serial No. 9,325

11 Claims. (Cl. 134—58)

This invention relates to making dry, free running pigment powders; and it comprises a method of converting pigments contained as fine particles in wet pastes or press cakes into soft-textured dry powders without sacrifice of particle fineness and of pigmentary quality, wherein the wet paste or press cake is mixed with more water to convert it into a thin uniform suspension, the suspension often carrying about 3 per cent solids and the suspension is gradually introduced into an agitated, comparatively large, boiling body of a volatile liquid immiscible with water and having no solvent action on the pigment, said body being contained in a still provided with a partial reflux and with an agitator, and ebullition and agitation are continued under azeotropic conditions till the water is removed and the dried and dehydrated pigment is separated from the volatile liquid; the aqueous pigment suspension being often emulsified with some of the volatile liquid prior to introduction into the still; all as more fully hereinafter set forth and as claimed.

Pigmented protective finishes, such as paints and varnishes, are compositions of various liquid vehicles, such as drying oils, lacquers, etc., with finely divided solid fillers or "pigments". Printing inks are similar in character. The composition of these finished materials is extraordinarily varied; the vehicle and the filler both depending upon the use to which the finish is to be put. In all cases, the pigment is used dry, it being impracticable to mix wet fillers with oil varnishes and extremely undesirable to have any moisture go into the composition with lacquers. In nearly all cases, however, the pigment is produced in a wet way, the product being a wet, fine-grained mixture of water and solids. Where the pigment is produced by precipitation or chemical reaction, as is often the case, the particles may be of colloid magnitude and in all cases they are very fine. It is usual to filter press, wash and dry the pigment in some sort of oven or furnace. Vacuum ovens are often used with delicate preparations. In any case, drying is an operation that requires careful regulation and in dried pigments there is always a change in structure involving a change in pigmentary value. Mostly, the pigment dries down as agglomerates or clods, giving dry products which are lumpy or gritty and which must be reground to give the fine particle size indispensable in a pigment.

In going from a wet pigment to a paint in the usual practice, there are two distinct "grinding" operations: a comminuting grinding to reduce lumpy or gritty dried pigments to impalpable powders; and an incorporative grinding in securing intimate admixture of the fine powders with a viscous vehicle.

Comminuting grinding is done in pebble mills, impact mills, or the like, and quite generally requires a long period of time. The dried materials are often horny or leathery, rather than frangible or brittle. But it is found that in all cases, except perhaps pure white pigments, the pigmentary value of the particles in the reground dried material is different from that of the particles in the original wet composition.

These difficulties are accentuated in certain inorganic pigments such as iron ferrocyanid blues, and in organic pigments of the toner type used to produce the more brilliant shades of colors in paints and enamels. These often contain azo dyes.

The original pigment particles are, as stated, of minute size; fine enough for any pigmentary purposes. But this fine texture is not preserved in drying.

In incorporating pigment or filler into paint or varnish, some sort of paint mill is required. The difficulty of incorporation depends, of course, upon the character of the pigment or filler. With some pigments, a colloid mill is useful. But the use of paint mills having rubbing elements analogous to the grinding elements in mills is standard practice. The action in incorporation is not a comminuting action, but considerable mechanical force and pressure are necessary. Much depends on the viscosity of the vehicle. This viscosity is usually high.

Some of the inorganic colors are not only difficult to comminute but are also hard to work into the vehicle. Iron ferrocyanid blues, for example, may require as much as 120 hours' grinding with paint vehicle in a pebble mill, to secure a smooth dispersion. And some organic pigments like "Fanchon maroon" or para toners require a considerable time in a pebble mill, to get satisfactory incorporation. Persian orange lake and Victoria blue phosphotungstic toner, which are used for printing inks, sometimes require as many as nine runs over a three-roller mill with printing ink varnish vehicles to produce a smooth printing ink.

In the present invention, one of these two grinding operations is done away with; the comminuting grinding required to make a fine filler or pigment from dried material. Dry powders are made having the fine texture of the solids in the wet materials. Moreover, the powders are commonly so dry and so fine in texture that the work in the second grinding, or paint mill operation, is considerably reduced. They are much finer and softer in texture than mechanically comminuted products and in incorporating in a vehicle, there is a saving in the mechanical energy and time.

When hydrated press cakes or sludges are dried in the ordinary way, as the intergranular water evaporates the hydrated particles stick together; the surfaces come together while moist. As in drying any other "mud", clumps and clods are inevitable. They may be due to adhesion or cohesion, but whatever the reason, the dried materials are coarse textured.

Maroon pigments containing dyes, for example, are, in most cases, extremely difficult to produce as soft textured, fine-grained pigment powders. For instance, a product commercially known as "Fanchon maroon", a pigment comprising the calcium salt of a monoazo dye formed from beta naphthylamine alpha sulfonic acid and beta hydroxy naphthoic acid, when manufactured and dried from a press cake or watery sludge in the ordinary way, produces very hard clumps or clods which when pulverized, no matter how fine, still retain the objectionable hardness. After comminution of the dried product, it is found that the powder, no matter how fine, is rather hard to work into a vehicle; there appears to be trouble in securing good contact between the liquid and solid.

In making a better pigmentary product from "Fanchon maroon" than can be obtained by drying and comminuting a press cake made from the original wet paste, a product retaining the original pigmentary value, requiring no comminuting and dispersing readily in viscous vehicles, I take the press cake or the original paste and mix with a rather large amount of water to make a thin uniform suspension. With "Fanchon maroon" press cake, I often use water equivalent to 5 times the weight of the press cake. The press cake usually runs about 18 per cent solids and 82 per cent water.

The press cake is broken up and dispersed in water by a high speed stirring apparatus to give a thin, free flowing suspension or slurry carrying about 3 per cent solids. Complete dispersion is wanted; and the more efficient the stirring the better. With some pigment pastes I use a colloid mill to insure complete disaggregation of the pigment paste or cake. The suspension is kept vigorously agitated to prevent deposition or stratification and is fed into a still provided with partial reflux arrangements and good agitating means. In this still, I establish and maintain a comparatively large boiling body of a volatile liquid immiscible with water and having no solvent action on the pigment. The liquid may be toluene, benzene, or any other comparatively low boiling hydrocarbon. Into this boiling agitated body of liquid, the thin suspension is fed as a fine stream to insure quick dispersion and as much subdivision as possible; subdivision into fine drops. Heating and reflux conditions are so adjusted that an azeotropic mixture of the vapors of water and volatile liquid pass over to a condenser. The condensed liquids stratify and the volatile liquid can be returned.

It is of importance that the entering stream of aqueous suspension be broken up into fine drops as quickly as possible, and, for this reason, it is a useful expedient, and one which I often employ, to add some of the volatile liquid to the aqueous suspension of the mixture and produce an emulsion; this emulsion being fed into the still as before.

In the press cake, the particles can be regarded as solids with hydrated surfaces brought together as closely as possible but with intervening films. When the press cake is broken up in water, these particles are spaced from each other to an extent depending on the amount of water used. When the dilute suspension is introduced into the still, the intergranular water is vaporized and the water of hydration of the surfaces of the particles is removed along with the volatile liquid, the two volatilizing to give an azeotropic vapor mixture. Before the particles can meet or touch each other, they are effectively freed of water; that is, dried. All these wet pigments contain water in the surface in some sort of union or combination; the surfaces are hydrated. The water of hydration is removed prior to mutual contact. The volume of water condensed serves as an index to the progress of the operation. At the end of the operation, the volume of the water collected should be equal to that in the original press cake plus the water added to make the free flowing suspension.

Another index of the progress of the operation is the boiling point of the liquid used; toluene, for example. As long as water is being driven off, the boiling point is below the normal.

With a given batch of press cake or paste made into a suspension with water, or with an emulsion of water, and volatile liquid, introduction into the still and ebullition therein are continued until the liquid in the still is dry. At this time, heating and distillation are discontinued and the dry powder separated from the volatile liquid. Sometimes agitation is stopped and the solids allowed to settle in the bottom, whence they are drawn off with a little volatile liquid, leaving the bulk of the liquid in the still for another operation. However separation is effected, the collected solids are freed of the volatile liquid by evaporation and are then ready for packaging. As stated, they need no mechanical comminution. The dry product is soft; there is no grit, and the apparent density of the powder in bulk is of the order of one-half that of pulverized press cake produced by conventional methods.

The choice of volatile liquid to be used is a matter depending on circumstances, provided it is immiscible with water and does not attack the pigment; the choice depending upon the desirable temperature in operation, the temperature of cooling water, costs, etc. Toluene has a convenient boiling point and I often use it. Benzene boils at a somewhat lower temperature. Both have the advantage of being commercially obtainable as pure liquids with fixed boiling points. The same is true of a number of chlorinated hydrocarbons which can be used as water immiscible liquids. Where a question of cost enters, hydrocarbon liquids, such as gasoline, naphtha, "Stoddard's solvent", etc., can be used. Their boiling points are not fixed, as in the case of pure liquids, but this is not a great disadvantage.

In operation, whatever the volatile liquid in the still, it is desirable that the aqueous liquid be converted into a sort of thin emulsion of spaced drops, each of which is individually dewatered. Stirring in the still should be energetic and the volume of volatile liquid rather large as compared with the volume of aqueous liquid entering at any given time.

In the accompanying illustration, there is shown diagrammatically a complete apparatus under the present invention, useful in the performance of the described process; this showing being partly in vertical section and partly in elevation. In the drawing:

1 is a mixing casing or vat adapted for making up the thin suspension of pigment paste or press cake. It is provided with a mixer 2 shown as of the propeller type. An emulsifier provided with rings and acting in the manner of an ordinary egg beater can be used. It gives active and efficient agitation to produce a thin smooth suspension. At the base, this casing communicates through valved outlet 3 and feed line 4 with a still 5 provided with a jacket 6 which can be used for heating or cooling, as later described. As shown, this still has the general form of a kettle mounted on standards 7, and is adapted to hold a body of the water-immiscible liquid. It is provided with a top 8 through which passes the feed line already described. The top carries a power driven stirrer 9, thermometer 10 and vapor outlet 11. Outlet line 11 is provided with a separable coupling 20 to allow removal of the top of the kettle. A capped outlet 21 is provided at the bottom of the kettle, for withdrawing materials therefrom. Into the kettle, below the level of the top passes a valved return line 12 for the immiscible liquid. The vapor line leads to a condenser indicated at 13. Condensate leaves the condenser through 14 and then passes into a settling device 15. The immiscible liquid is ordinarily a volatile hydrocarbon of density less than water, so that in the settling device condensed water underlies the lighter liquid. The latter is led off through a trapped outlet (12) previously described. This outlet is provided with a vent pipe 16. In the settling tank is provided a depending baffle plate 17 to prevent emulsified water going back into the hydrocarbon return line.

In a specific example of the invention, making use of this apparatus with the described "Fanchon maroon" press cake, the press cake is broken up with water in vat 1 to form a suspension containing about 3 per cent solids and this suspension is introduced through line 4 into kettle 5 as a thin stream. In kettle (5) is a substantial body of boiling toluene. As the stream enters, it is stirred into this boiling body. The water evaporates. The solid particles in the suspension being isolated from each other, they are practically individually treated in this mode of operation; each is in a boiling body of toluene and loses its surface water freely. This feed of suspension is continued until a sufficient amount of fine dehydrated material has accumulated in the kettle. During this time, the thermometer 10 indicates a boiling point below that normal to pure toluene and water condenses and appears in 15. Condensed hydrocarbon goes back through trapped pipe 12. After interruption of the flow of suspension, boiling is continued until water no longer appears in the condenser and until the boiling point shown by the thermometer 10 is that of pure toluene. At this time, heating is stopped and the kettle is cooled by running water into the jacket. When the contents of the kettle are cold, they are removed through outlet (21) at the bottom of the kettle, and the solid separated by means of either centrifuging or filtering. The filtering, of course can be accomplished by means of porous plates and can be accelerated by vacuum; or it can be carried out in an ordinary closed delivery filter press. The toluene recovered can be used in another operation and the solid powder, on simple drying and aeration, becomes a loose, free running powder of minute particle size and having the original pigmentary value.

An important feature of the described procedure is the initial preparation of a thin, free flowing suspension or emulsion in a sufficient amount of water to isolate and space the particles with sufficient stirring to produce and maintain uniformity of distribution. Thick pastes and press cakes, in which the particles are in contact, or nearly so, do not give good results. The amount of water required varies with the particle size and character, but a suspension carrying around 3 per cent solids is generally satisfactory.

At the end of the operation, instead of cooling the still and physically separating the liquid (toluene, etc.,) and the dehydrated solids, the heating may be increased and the liquid distilled over in pure form.

Toluene, benzene and the light hydrocarbon oils generally being miscible with oil varnish, with which indeed they are used as thinners, there is often no advantage in removing all traces of liquid from the dehydrated pigment particles. And it is possible to make pulps, or mixtures, or pastes still containing considerable residual liquid. These are convenient sometimes because of the ease with which they can be blended with varnish bases. For example, in distilling off the liquid at the end of the operation, enough liquid can be left with the pigment mass to give a paste which can be used and marketed as such.

The treatment described applied to "Fanchon maroon" produces a product which is, practically speaking, entirely new: a loose running very fine dry dehydrated powder; readily incorporated into an oil varnish bath because of its fineness and its utter dryness. Similar good results are obtained with another toner much used, "Victoria maroon". This is a manganese containing composition with the same dye base.

However, like good results can be obtained with any other wet pigmentary press cake or paste, as with the ferrocyanid blues mentioned. Pigments with which I have obtained good results are the general class of insoluble dyestuffs, including the so-called organic toners, lake toners and lakes. Many of these materials are difficult to produce in satisfactory pulverulent pigment form by ordinary methods, but by the present method readily yield bright colored powders, soft in texture, fine-grained, dry and dehydrated and of easy dispersibility.

Organic toners comprise pigments which are formed as suspensions by reaction of an azo compound with a phenolic body; for example, toluidine red toner, made by coupling a diazo solution of meta-nitro-para-toluidine with beta-naphthol; giving a wet pasty product which can be filter-pressed, washed, dispersed and treated as described.

Lakes and lake toners are formed by precipitating a soluble dyestuff with metallic salts or other inorganic compounds, to produce an insoluble product. "Fanchon maroon", previously described, is a pigment of this type. Often the inorganic carrier substance is alumina. For example, alizarin maroon lake is an alumina lake of a certain soluble alizarin dye. China clay is sometimes used as a carrier.

As so far described, the treatment is of pastes and press cakes which are to be thoroughly dried and afterwards worked into oily or spiritous paint and varnish vehicles where absence of water is necessary. But the present method of drying can be used in connection with other pastes and powders which are to be converted into loose, free running powders and packaged for uses in which redispersibility in water is desired. It is sometimes desirable to produce dry powders of rather insoluble pigments capable of quick and intimate dispersion in water or aqueous liquids. In this event, the original wet paste may have an addition of any of the numerous known wetting-out agents, such as sugars, dextrin, glue, sulfite liquor, etc. In making the dispersion, the wetting-out agent distributes itself through the liquid, but in the drying operation, it is afterwards brought back to the particles and the dry particles carry with them the wetting-out agent.

Many vat dyes are customarily sold as pastes, for the reason that ordinary drying, with the resultant aggregation, puts them in a form less miscible with water. In dehydrating by the present process, the original particle size can be preserved and also a free dispersibility in water by the use of an emulsifying agent. Operating in this manner, it is possible to put many wet dye paste preparations on the market as dry, free running powders.

In a specific example of this modification of the invention, there was taken 1000 grams of a wet press cake of permanent violet toner, that is a phospho-tungstate precipitate of methyl violet. The solid content of the press cake was about 19 per cent. To the cake was added about 1200 grams of a form of dextrin soluble in cold water. The press cake immediately dispersed into a thin liquid slurry; a colloidal suspension of the pigment. This solution was thinned further with 1000 grams water and the suspension was passed into a boiling body of 3000 grams of petroleum naphtha in the apparatus described. Boiling was continued until all water was removed. The mixture of pigment and naphtha was removed from the kettle and the adhering naphtha was evaporated. The dry, pulverulent product was of a soft nature and readily dissolved in water to form a colloidal solution of high tinctorial powers.

In the ordinary mode of operation, endeavoring to make redispersible powders, the original press cake with added dispersing agent would be dried by heat or vacuum, as in oven pans, vacuum driers or rotary drum driers. The product of such operations is more or less lumpy or granular and has to be pulverized before use. The pulverized product is markedly inferior to the original precipitate in tinctorial value. And it does not readily dissolve in water. The present method makes possible manufacture of pigments for use with aqueous vehicles, such as in showcard colors and the like, from pigment materials hitherto not capable of utilization for such purposes.

In carrying out this modification, I have found that when sugar is used, the admixed immiscible liquid is advantageously benzol. Toluene or petroleum naphtha work better when dextrin is used.

The amount of dextrin or sugar used in this modification is best taken as about 5 to 7 parts by weight for each part pigment (dry basis).

As is well known, iron oxid pigments made in the dry way are not bright colored. For this reason, high grade iron oxid pigments are always made in the wet way and usually by oxidizing ferrous oxid. It has been found that in drying these pigments in the usual way, they forfeit considerable brightness of color. Wet ferric oxid pigment materials may, however, be advantageously dried and dehydrated under the present invention without sacrifice of tint.

As stated with regard to "Fanchon maroon" and "Victoria maroon", some of the products of the process of the present invention are new for practical purposes. They are not only loose running, completely dry powders, but the surfaces of the particles are dehydrated so that they blend at once with oily vehicles. In the usual employment of both pigments, there is the dilemma that if they be dried in the air and reground, the pigmentary value suffers and incorporation is not easy, while unusual expedients are required to secure the incorporation of a wet press cake in an oily vehicle.

Other products which are new are the stated dyed white clays. The dye is on the surface of the particle and if the clay be dried down, and afterwards recomminuted, there are undyed fracture faces which militate against the purity of color. I however regard the invention as must useful with pigments consisting of or comprising azo dyes. With materials containing azo dyes there are not only the difficulties attendant on drying any other pigmentary paste or press cake but the additional difficulty that most of these dyes are somewhat unstable; they contain complex nitrogen linkages.

As stated, a pigmentary product is not always delivered as a loose, free running powder by the present method since some of the solvent used in the azeotropic removal of water may be left with the dried and dehydrated product to form a paste convenient for admixture with paint and varnish vehicles. The low boiling azeotropic liquids generally used in the present process, benzene, toluene and mineral spirits, are often used as thinners in paints and varnishes and the presence of some of the solvent with the pigment much facilitates admixture in the second or incorporating grinding. And it lessens the amount of thinner to be added later. In fact, mere stirring is often sufficient.

Sometimes it is advantageous to resort to an artifice in making these partly pigmentary compositions which consists in having a certain amount of high boiling liquid material present in the volatile liquid used for dehydrating; something which will be useful as a blending agent or plasticizer in subsequent operations where a paste is made. For example, a little turpentine or drying oil, such as linseed oil or a plasticizer such as dibutyl phthalate may occur in the boiling bath as a third body. When the bulk of the solvent is removed the third body, etc., is left associated with the pigmentary paste.

As the liquid used for removing water a low boiling substance is not wholly necessary. The same azeotropic actions occur with all hydrocarbons and other liquids immiscible with water irrespective of their boiling point. While I prefer benzene, toluene or low boiling mineral spirits such as gasoline, naphtha, "Stoddard's solvents" and the like, kerosene and even higher boiling hydrocarbon oils may be used. But it is in general better to use the low boiling liquids with only such an amount of higher boiling liquids as may be wished to remain with the finished product for one reason or another.

What I claim is:

1. The process of converting wet pigment press cakes and pastes into dry, free running, dehydrated powders without sacrifice of pigmentary value, which comprises admixing the wet material with enough water to make a free flowing, uniform aqueous suspension carrying isolated pigment particles, gradually passing the suspension as a fine stream into an agitated body of a hot volatile liquid of a type having substantially no solvent action on the pigment and being immiscible with water and capable of forming an azeotropic vapor mixture with water, the proportion of water to immiscible liquid being maintained small, continuously removing the water by azeotropic distillation and isolating the dehydrated pulverulent material thus produced.

2. The process of converting wet pigment press cakes and pastes into dry, free running, dehydrated powders without sacrifice of pigmentary value, which comprises adding a wetting-out agent to the wet material and producing a thin suspension and then gradually passing the suspension as a fine stream into an agitated body of hot liquid of a type having substantially no solvent action on the pigment and being immiscible with water under such conditions that the proportion of water to immiscible liquid is maintained small, the liquid being volatile and capable of forming an azeotropic vapor mixture with water, continuously removing the water by azeotropic distillation and isolating the dehydrated pulverulent material thus produced.

3. The process of converting wet pigment press cakes and pastes into dry, free running, dehydrated powders without sacrifice of pigmentary value which comprises mixing the wet material with more water and with a modicum of liquid of a type having substantially no solvent action on the pigment and being immiscible with water to produce a thin suspension and then gradually passing the suspension as a fine stream into an agitated body of hot volatile liquid immiscible with water and capable of forming an azeotropic vapor mixture therewith, the proportion of water to immiscible liquid being maintained small, continuously removing the water by azeotropic distillation and isolating the dehydrated pulverulent material thus produced.

4. The process of converting wet pigment press cakes and pastes into dry, free running powders without sacrifice of pigmentary value which comprises emulsifying the material with additional water and liquid of a type having substantially no solvent action on the pigment and being immiscible with water, forming a thin suspension and gradually passing the suspension as a thin stream into an agitated body of hot volatile liquid immiscible with water, and capable of forming an azeotropic vapor mixture therewith, the proportion of water to immiscible liquid being kept small, and continuously removing the water by azeotropic distillation and isolating the dehydrated pulverulent material thus produced.

5. The process of claim 1 wherein the liquid is toluene.

6. The process of claim 1 wherein the liquid is benzene.

7. The process of claim 1 wherein the liquid is a low boiling petroleum distillate.

8. The process of claim 1 wherein the wet pigment preparation is an insoluble azo dye united with an inorganic carrier.

9. The process of claim 1 wherein the wet pigment matter is a lake.

10. The process of claim 1 wherein the wet pigment preparation comprises a mixture of dextrin and insoluble pigment, and the finished product is readily water dispersible.

11. The process of converting wet pigment press cakes and pastes into dry, free running, dehydrated powders without sacrifice of pigmentary value, which comprises admixing the wet material with enough additional water to make a free flowing, uniform aqueous suspension carrying isolated pigment particles, gradually introducing the suspension into an enclosure containing an agitated body of a hot volatile liquid of a type having substantially no solvent action on the pigment and being immiscible with water and capable of forming an azeotropic vapor mixture therewith, controlling the introduction at such a rate that the volume of immiscible liquid in the enclosure at any time is large compared to the volume of inflowing watery suspension, whereby the wet particles are widely separated and dispersed in the immiscible liquid during introduction, continuously removing the water by azeotropic distillation and isolating the dried and dehydrated pulverulent material thus produced.

VINCENT VESCE.